United States Patent [19]

Jahns

[11] Patent Number: 4,595,865
[45] Date of Patent: Jun. 17, 1986

[54] CURRENT-SENSING SCHEME FOR SWITCHED RELUCTANCE MOTOR DRIVES

[75] Inventor: Thomas M. Jahns, Schenectady, N.Y.

[73] Assignee: General Electric Company, Schenectady, N.Y.

[21] Appl. No.: 793,368

[22] Filed: Oct. 31, 1985

[51] Int. Cl.[4] .............................................. H02P 6/02
[52] U.S. Cl. .................................. 318/254; 318/138; 318/439
[58] Field of Search .................. 318/138, 254 A, 254, 318/439, 696, 599, 634, 811

[56] References Cited

U.S. PATENT DOCUMENTS

| | | |
|---|---|---|
| 3,584,280 | 6/1971 | Inagaki et al. ....................... 318/254 |
| 3,916,272 | 10/1975 | Grünleitner et al. ................ 318/138 |
| 4,359,674 | 11/1982 | Gotou ................................... 318/318 |
| 4,409,524 | 10/1983 | Nielsen et al. ...................... 318/138 |
| 4,500,824 | 2/1985 | Miller ............................... 318/254 X |

*Primary Examiner*—William M. Shoop, Jr.
*Assistant Examiner*—Bentsu Ro
*Attorney, Agent, or Firm*—Mark L. Mollon; James C. Davis, Jr.; Marvin Snyder

[57] ABSTRACT

By using the on-state forward voltage drops of the power switches to measure phase currents, and by using diode logic to sense the voltage drops, it is possible for a single voltage comparator to perform the current regulation function for an entire power converter. Current regulation is obtained in drives using either overlapping or nonoverlapping current conduction for excitation of the motor phases. A thermistor compensates for offsets and for temperature sensitivity of the power switch voltage drops.

34 Claims, 6 Drawing Figures

CURRENT-SENSING SCHEME FOR SWITCHED RELUCTANCE MOTOR DRIVES

BACKGROUND OF THE INVENTION

The present invention relates in general to regulating the phase currents in a multi-phase motor, and more specifically to sensing the phase currents in a multi-phase motor using a single voltage comparator.

Variable reluctance motors have teeth-like poles on both the stator and the rotor. There are windings on the stator but no windings on the rotor. Each pair of diametrically opposite stator windings is connected in series to form one phase of the motor.

Torque is produced by switching current on in the phases in a predetermined sequence so that a magnetic force of attraction results between the rotor and stator poles that are approaching each other. The current is switched off in each pair of windings at the commutation point before the rotor poles nearest the stator poles of that pair of windings rotate past the aligned position, otherwise the magnetic force of attraction will produce a negative or braking torque.

The torque developed is independent of current direction. Therefore, unidirectional current pulses synchronized with rotor movement can be generated in a converter using a single unidirectional current switching element such as a thyristor or transistor in each leg of the converter, and supplied to the corresponding phase of the motor.

Each time a phase of the motor is energized by closing a switch in the converter, current flows in the pair of stator windings of that phase, providing energy from a DC supply to the motor. The energy drawn from the supply is converted partly into mechanical energy, by causing the rotor to rotate towards a minimum reluctance configuration, and converted partly into stored energy in the magnetic field. When the switch is opened, part of the stored magnetic energy is converted to mechanical output and the remainder of the energy is preferably returned to the DC supply.

The motor may be run open-loop as in a variable reluctance stepping motor, or may be run closed-loop as in a switched reluctance motor. Furthermore, the motor may be operated such that no two phases are conducting simultaneously (i.e. nonoverlapping conduction intervals) or such that some phases do conduct simultaneously (i.e. overlapping conduction intervals).

Current regulators are employed for limiting the phase current amplitudes in the motor. The current level in each phase is sensed by individual current shunts connected to each phase winding. The output of each current shunt is connected to a separate voltage comparator. Each comparator is also connected to a separate potentiometer for setting the current limit. In order to adjust all of the phase currents simultaneously using a single control knob, a multi-stage ganged potentiometer is used.

By employing separate current shunts in each phase, the power loss in the shunts is high. This is particularly true in automotive applications where the low 12 volt source voltage magnifies the efficiency penalty associated with the resistive shunt voltage drops. The necessity of a separate comparator for each motor phase inflates the parts count and the expense of the regulator. A further disadvantage is that the multi-stage ganged potentiometer is expensive.

Accordingly, it is a principal object of the present invention to provide a current regulator having reduced power loss and increased efficiency.

It is a further object of the present invention to provide a current regulator having a reduced parts count.

It is yet another object of the invention to eliminate the need for a multi-stage ganged potentiometer in a current regulator for a multi-phase motor.

SUMMARY OF THE INVENTION

These and other objects are achieved in a current regulator for limiting phase current amplitudes in a multi-phase motor drive employing unidirectional current excitation from a DC source, each phase of the motor drive including a phase winding for connecting in series with a respective semiconductor switch, the regulator comprising a comparator, sensor means, resistor means, voltage-reference means, anti-latching means, delay means and turn-off means.

The comparator generates a low logic level output signal when any instantaneous phase current exceeds a regulated current limit. The sensor means is coupled to the inverting input of the comparator and is adapted to be coupled to the semiconductor switches for providing voltage signals, each of the voltage signals being proportional to the instantaneous phase current of a respective phase. The resistive means couples the sensor means to a DC voltage.

The voltage-reference means is coupled to the noninverting input of the comparator for providing a reference signal proportional to the regulated current limit, the voltage-reference means preferably including a potentiometer for variably setting the reference signal. The anti-latching means is coupled to the inverting input of the comparator and to the sensor means for decoupling the inverting input of the comparator from the sensor means when the comparator generates a low level output signal.

The delay means is coupled between the comparator noninverting input and the comparator output for reducing the reference signal for a predetermined time after each transition to a low level output signal from the comparator output. The turn-off means is coupled to the comparator output and is adapted to be coupled to the semiconductor switches for turning off the semiconductor switches when the comparator generates a low level output signal. Thus, the conduction intervals of the semiconductor switches are pulse-width modulated to regulate the amplitudes of the phase currents.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
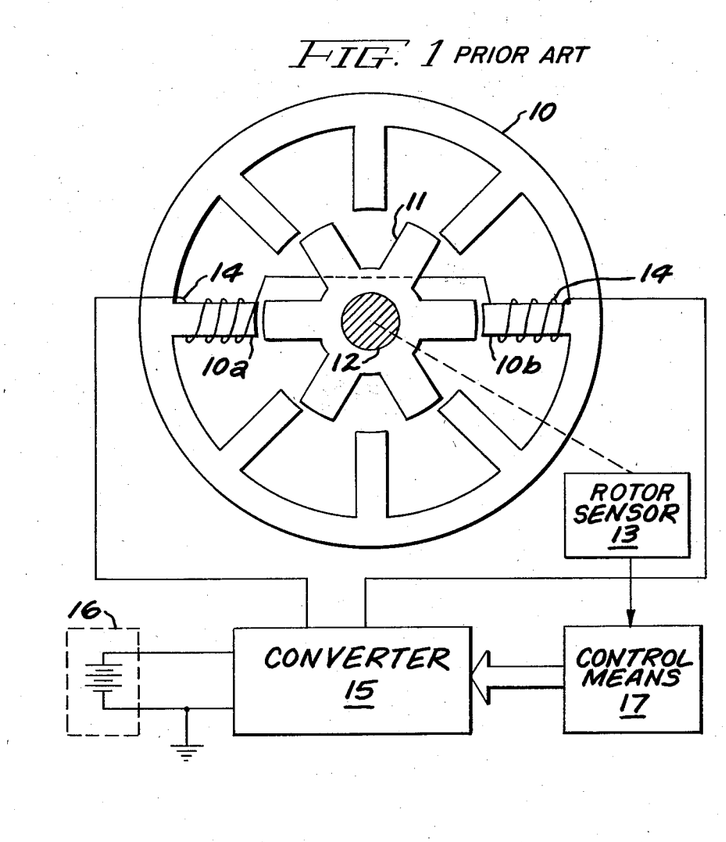
FIG. 1 is an illustration of a conventional switched reluctance drive.

FIG. 1 illustrates a switched reluctance drive of a type which may beneficially employ the regulator of the invention. The drive includes a laminated iron stator 10 which has a plurality of stator pole pairs including a pair comprised of stator pole 10a and stator pole 10b. A laminated iron rotor 11 has a plurality of rotor pole pairs, typically one less pair of rotor poles than pairs of stator poles. Rotor 11 is fastened to a shaft 12 and drives a rotor position sensor 13.

A winding 14 is wound on stator poles 10a and 10b and is connected to a converter 15. Other windings (not shown) on the remaining stator pole pairs are also connected to converter 15. A DC source 16 (such as a battery or a rectified AC source) is connected to converter 15. A control means 17 receives a rotor position signal from rotor sensor 13 and provides firing signals to converter 15 for energizing the phase windings in a predetermined sequence. Rotor position may alternatively be determined indirectly, by sensing back EMF in the motor, for example.

Figure 2:
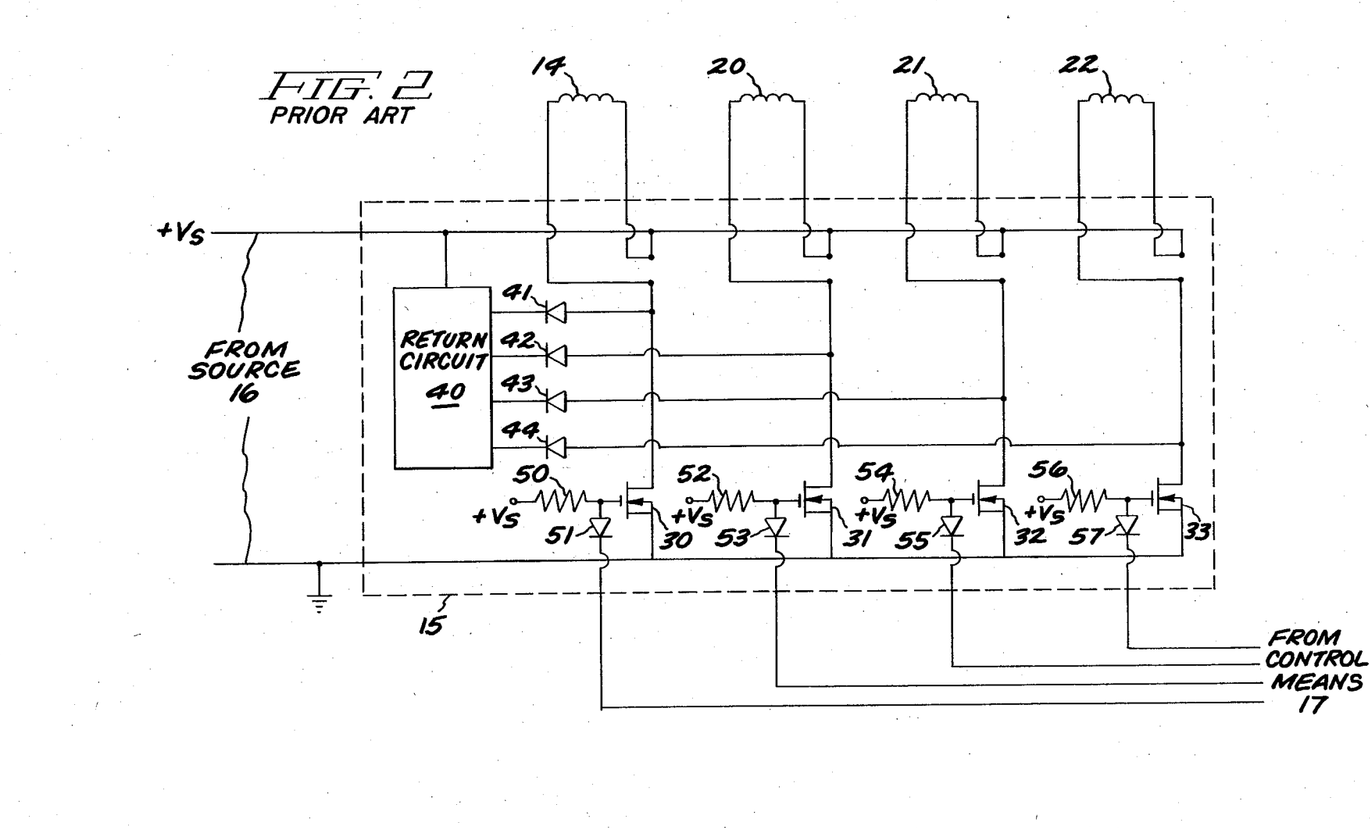
FIG. 2 is a schematic diagram of a conventional power circuit for a switched reluctance motor drive.

Converter 15 is shown in greater detail in FIG. 2. Phase windings 14, 20, 21 and any other phases up to and including phase 22, are each respectively connected in series with a field-effect transistor (FET) 30–33, respectively, across DC source 16. The gate electrodes of FETs 30–33, respectively, are coupled to DC voltage $+V_s$ by resistors 50, 52, 54 and 56, respectively, and to control means 17 by diodes 51, 53, 55 and 57, respectively. Thus, when a respective control signal from control means 17 is high, a respective diode becomes back-biased and the gate of the respective FET is high, thus turning on the FET. When a respective control signal is low, the respective diode is forward-biased and the FET is turned off.

Each phase winding 14, 20, 21 and 22 is coupled to a return circuit by diodes 41–44, respectively. At the end of each conduction interval of each phase, stored magnetic energy in the respective winding is returned to the DC source through return circuit 40 and the respective diode. Examples of return circuit 40 are disclosed in Miller, U.S. Pat. No. 4,500,824, issued Feb. 19, 1985, which is of common assignment and which is hereby incorporated by reference.

Semiconductor switches 30–33 are shown in FIG. 2 as FETs, but other devices may be used such as bipolar transistors, silicon controlled rectifiers (SCRs), gate turn-off thyristors (GTOs) and insulated-gate transistors (IGTs). The FET and the IGT are preferred devices because of the nature of their on-state voltage drop. In their on-state, the FET and the IGT have a resistive impedance such that the drain-to-source voltage $V_{ds}$ is substantially linearly proportional to the drain current of the device.

Figure 3:
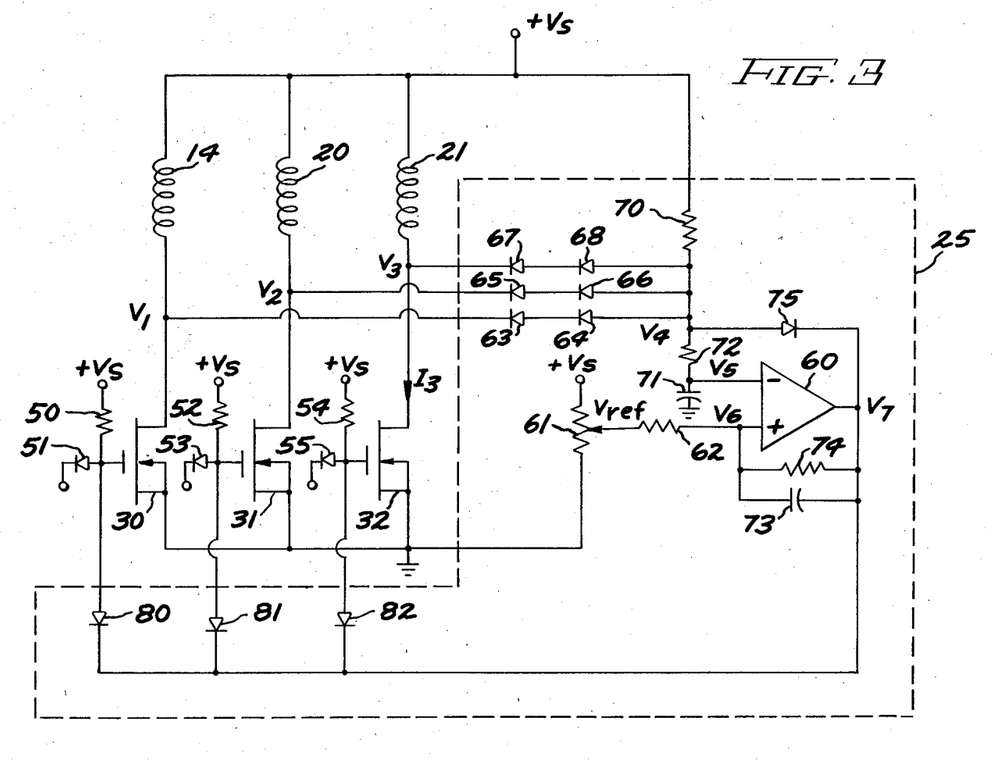
FIG. 3 is a schematic diagram showing the current regulating circuitry of the present invention for nonoverlapping conduction intervals.

One embodiment of a current regulator circuit in accordance with the present invention and adapted to be used with a drive circuit using nonoverlapping conduction intervals, is shown in FIG. 3. Current regulator circuit 25 pulse-width modulates the FET conduction intervals in order to regulate each phase current amplitude. Diode logic is used in a manner to permit use of a single comparator to perform this current regulation.

FIG. 3 shows a drive circuit for a three-phase motor. Each phase is rendered conductive or nonconductive by application of signals to diodes 51, 53 and 55. Current regulator 25 includes a potentiometer 61 having one end connected to DC voltage $+V_s$ and its other end connected to circuit common. The output of potentiometer 61 provides a reference voltage $V_{ref}$ which is coupled to the noninverting input of a comparator 60 by a resistor 62. A delay circuit including a capacitor 73 and a resistor 74 in parallel is coupled between the noninverting input of comparator 60 and the output of comparator 60. A plurality of diodes 80–82, respectively, couple the gates of FETs 30–32, respectively, to the output of comparator 60 for turning off the phase currents when comparator 60 provides a low logic level output signal.

A capacitor 71 couples the inverting input of comparator 60 to circuit common. One side of a resistor 72 is connected to the inverting input of comparator 60. The other side of resistor 72 is coupled to DC voltage $+V_s$ through a resistor 70. The junction between resistors 70 and 72 is coupled to each phase through a plurality of series-connected diode pairs for sensing each phase current. Thus, a pair of diodes 63 and 64 is connected to FET 30, diodes 65 and 66 are connected to FET 31 and diodes 67 and 68 are connected to FET 32. The junction between resistors 70 and 72 is also coupled to the output of comparator 60 by a diode 75.

In operation, assume that the phases including windings 14 and 20 are held off by applying signals to diodes 51 and 53 which are low, while the signal applied to diode 55 is high, thus activating the phase containing phase winding 21. Voltages $V_1$ and $V_2$ across FETs 30 and 31, respectively, will be high (equal to $V_s$ for zero current), while $V_3$ will be a much lower voltage following the on-state voltage drop of FET 32. The FET voltage drop is approximately the instantaneous drain current multiplied by the characteristic on-state resistance of the FET ($R_d$). Thus, $V_3$ will be proportional to $I_3$. Therefore, $V_4$ (the voltage signal at the junction of resistors 70 and 72) will follow $V_3$, the difference being two diode drops ($2.V_d$) across diodes 67 and 68, while diodes 63–66 are reverse biased. Diode pairs are employed for purposes of voltage level shifting to improve performance of the comparator operation.

Potentiometer 61 sets a reference signal $V_{ref}$ at the noninverting input of comparator 60. Capacitor 71 and resistor 72 comprise a filter for filtering the voltage signal $V_4$. Thus, $V_5$ is a filtered voltage signal proportional to the instantaneous phase current of the phase which is conducting. As long as $V_5$ is lower than voltage signal $V_6$ at the noninverting input of comparator 60 (i.e. the instantaneous phase current has not exceeded the regulated current limit), the output signal of comparator 60 is high, diode 82 is reverse biased and FET 32 stays on. When the instantaneous current flowing through FET 32 is high enough so that $V_5$ rises above $V_6$ ($V_6$ is substantially equal to $V_{ref}$ because resistor 74 is very much larger than resistor 62), then comparator 60 transitions to a low output signal, thus turning off FET 32. When FET 32 turns off, $V_3$ rises to $V_s$ and diodes 67 and 68 become reverse biased. At that time, diode 75 becomes forward biased, thus preventing $V_4$ from latching at a high level (i.e. diode 75 decouples the FET voltage drops $V_1$, $V_2$, and $V_3$ from the inverting input).

When the output signal of comparator 60 switches to a low level, capacitor 73 transiently reduces voltage signal $V_6$ at the noninverting input of comparator 60 down to a voltage level below $V_{ref}$. Thus, the output signal of comparator 60 will remain low until capacitor 73 has recharged to a voltage above $V_5$ at the inverting input of comparator 60. The recharging of capacitor 73 is dominated by the time constant comprising the resistance of resistor 62 times the capacitance of capacitor 73. Resistor 74 provides a relaxation path for the recharge of capacitor 73 as well as controlled steady-state hysteresis in the comparator switching thresholds. Thus, a fixed delay is introduced, after which the output of comparator 60 reverts to a high level. The fixed delay may alternatively be introduced in many other ways, such as by means of a monostable multivibrator or by means of resistor-diode-capacitor circuits.

When $V_6$ has increased to the level of $V_5$, the output signal of comparator 60 returns to a high logic level, turning on FET 32 so that the phase current can again build-up (FETs 30 and 31 remain off until turned on by control means 17 of FIG. 1). Timed turn-off by the comparator of the phase switches is employed because the regulator sensing circuit loses track of the instantaneous phase current when comparator 60 is in its low state. In the operation of the circuit shown in FIG. 3, if two phases were simultaneously conducting then $V_4$ would follow the lower of the two phase currents. Thus, the higher of the two phase currents could reach dangerously high levels since it is unregulated. The circuit of FIG. 3 is intended for operation with nonoverlapping conduction intervals, but may be modified for overlapping conduction intervals as will be discussed below with reference to FIG. 6.

Figure 4:
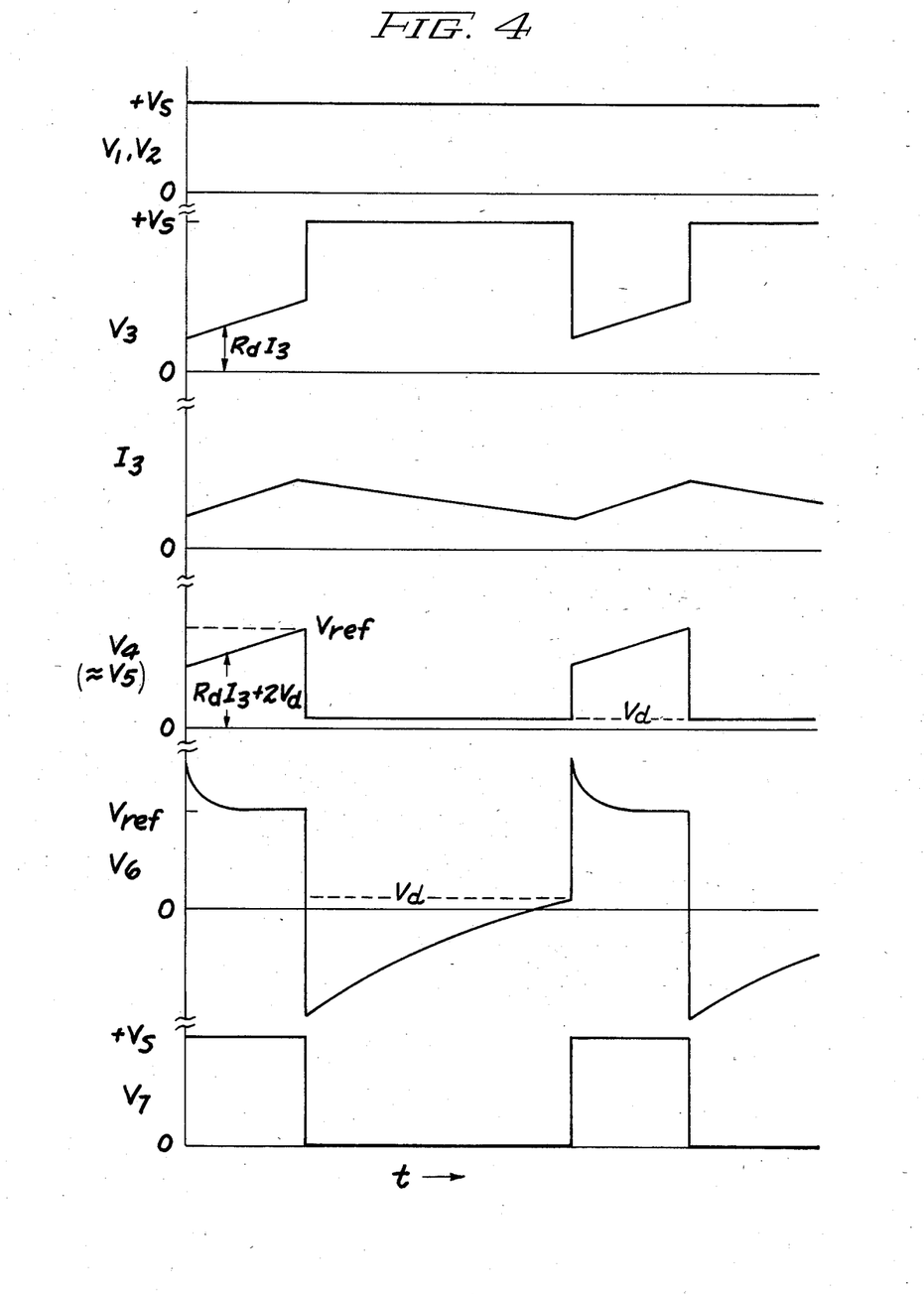
FIG. 4 is a waveform diagram illustrating some of the voltage waveforms occurring during the operation of the circuit in FIG. 3.

FIG. 4 shows some of the voltage signals during operation of the circuit in FIG. 3. Thus, at t=0, the output signal of the comparator $V_7$ is high, and $V_4$ is proportional to the voltage drop across the conducting FET plus two diode drops. When $V_7$ switches to a low level, $V_6$ transiently drops to a negative value and then increases as the capacitor recharges. When $V_6$ rises above $V_4$ (i.e. one diode drop), $V_7$ rises to a high level and $V_6$ returns to the value of $V_{ref}$. Thus, the phase current $I_3$ is limited to a regulated current limit.

It is desirable to regulate the phase current amplitudes at exactly the same level for smooth torque production. This would require the circuit of FIG. 3 to have semiconductor switches 30–32 with identical on-state voltage drops. However, there may be some variation of this characteristic among devices. Furthermore, the on-state FET voltage drop increases with temperature, causing the regulated average current to gradually drop as the FETs heat up.

Figure 5:
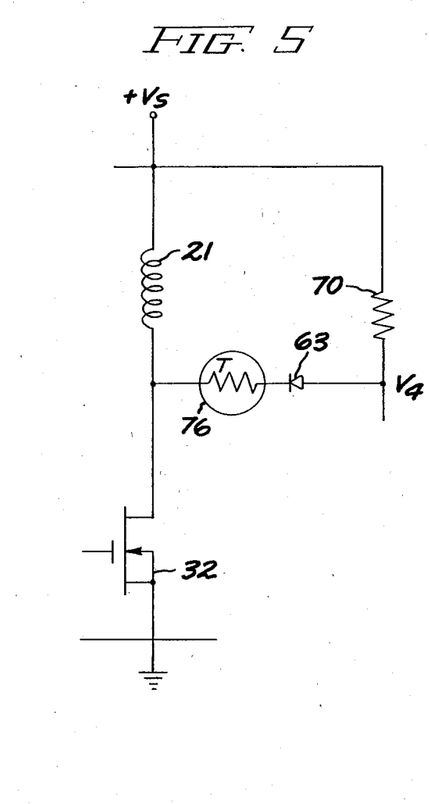
FIG. 5 is a schematic diagram illustrating a modification of the circuit in FIG. 3 for providing phase balancing and temperature compensation.

FIG. 5 shows a modification of the circuit of FIG. 3 which corrects FET mismatching of moderate levels and compensates for the positive temperature coefficient of the on-state resistance of the FET. Diode 67 of FIG. 3 is replaced by an offset thermistor 76. Thus, a variable offset can be introduced into the $V_4$ voltage signal by selecting the value of thermistor 76 to compensate for a mismatched value of the on-state resistance of FET 32 which may be measured. A similar thermistor may be introduced into any or all of the remaining phases.

By employing a thermistor having a resistance with a negative temperature coefficient of the same magnitude as the on-state resistance positive temperature coefficient of the FET switches (typically 0.006/C°, normalized), the temperature sensitivity of the $V_4$ voltage signal can be significantly reduced or eliminated. For effective temperature compensation, thermistor 76 must be mounted in close physical proximity to FET 32 in order to expose it to the same temperature fluctuations. As an alternative to the fixed thermistor which must be individually selected and matched to the FET, a combination thermistor and trimming potentiometer may be used to combine the advantages of temperature compensation and convenient voltage offset adjustment.

Figure 6:
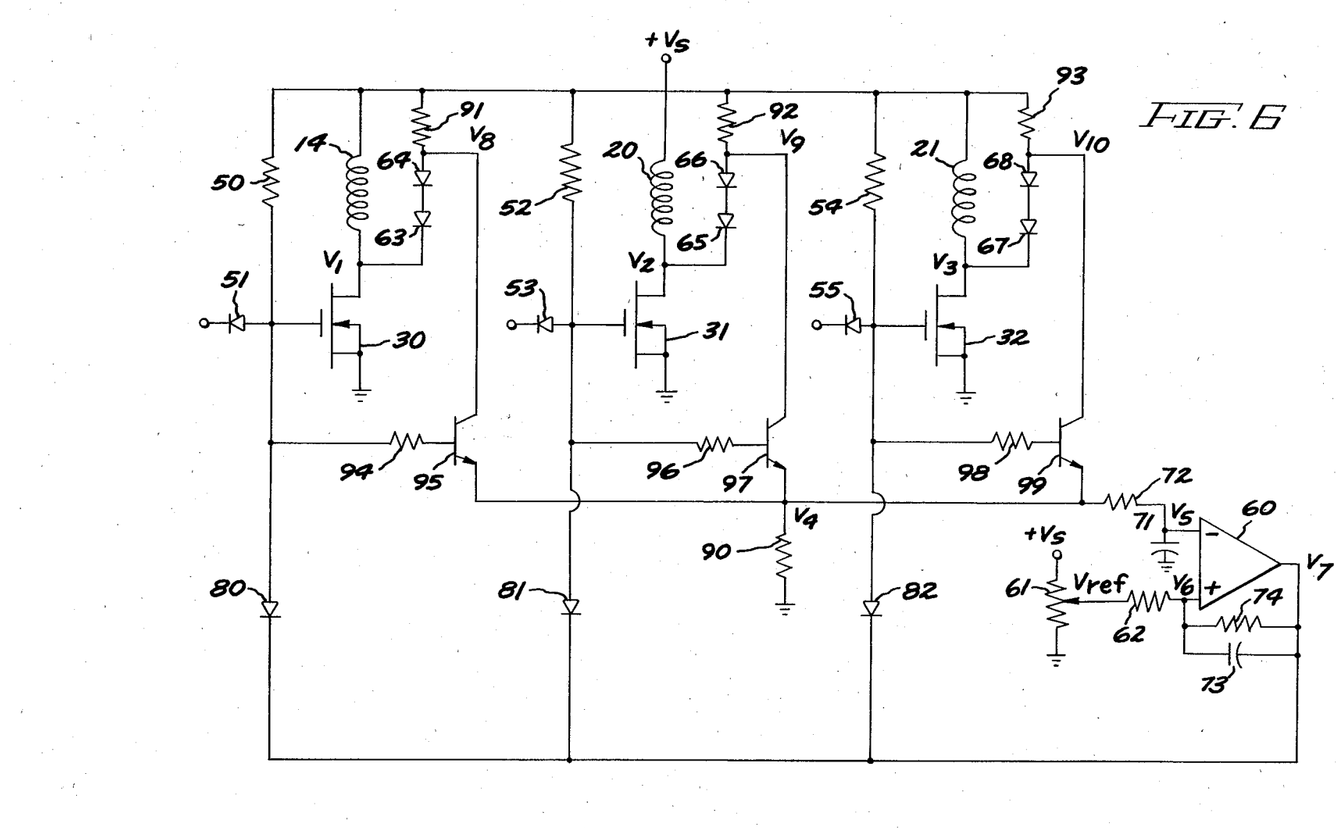
FIG. 6 is a schematic diagram including the current regulation circuit of the invention for use with overlapping conduction intervals.

An embodiment of the invention adapted for a motor drive employing overlapping phase conduction intervals is shown in FIG. 6. In this case, each diode pair 63 and 64, 65 and 66, and 67 and 68 is coupled to DC voltage $+V_s$ by a resistor 91–93, respectively. Each respective diode pair is now coupled to resistor 72 through a respective bipolar transistor 95, 97 and 99 (or other solid-state device). The base of each transistor is coupled to the gate of a respective FET 30–32, by resistors 94, 96 and 98, respectively. A resistor 90 couples resistor 72 to circuit common. When one of FET switches 30–32 are on, its respective transistor 95, 97 or 99 will also be on. Thus, a voltage signal $V_8$, $V_9$, or $V_{10}$ developed across a respective diode pair will be coupled to resistor 90 whenever the respective phase is energized. Voltage signal $V_4$ across resistor 90 is determined by the higher of the on-state voltages of the FET switches which are simultaneously conducting, thus allowing regulation of the highest instantaneous phase current. Transistors 95, 97 and 99 also prevent the inverting input of comparator 60 from latching to a high level when the output signal from the comparator goes to a low level. The operation of the current regulator circuit in FIG. 6 is similar to the operation of the circuit shown in FIG. 3. However, the circuit shown in FIG. 6 acts to regulate the highest phase currents which are simultaneously gated on. Thermistors may also advantageously be used in the circuit of FIG. 6 as a replacement for one diode of each pair.

The foregoing describes a current sensing and regulation scheme which eliminates the losses of separate current shunts in each phase. The current regulator uses a single comparator, thus eliminating the need for multiple comparators and their associated biasing networks. The parts count of the regulator is reduced and the need for a multi-stage ganged potentiometer is eliminated. The invention is applicable to a motor drive with an arbitrary number of phases. In addition to its application to switched reluctance motors, the invention may be advantageously employed with any other motor drive which uses unidirectional current excitation.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the invention be limited only by the scope of the appended claims.

What is claimed is:

1. A current regulator for limiting phase current amplitudes in a multiphase motor drive employing unidirectional current excitation from a DC source, each phase of said motor drive including a phase winding for connecting in series with a respective semiconductor switch, said regulator comprising:

a comparator having a noninverting input, an inverting input and an output, said comparator generating a low logic level output signal when any instantaneous phase current exceeds a regulated current limit;

sensor means coupled to said inverting input and adapted to be coupled to said semiconductor switches for providing voltage signals, each of said voltage signals being proportional to the instantaneous phase current of a respective phase;

voltage-reference means coupled to said noninverting input for providing a reference signal proportional to said regulated current limit;

anti-latching means coupled to said comparator and to said sensor means for decoupling said inverting input from said sensor means when said comparator generates a low level output signal;

delay means coupled to said comparator for reducing said reference signal for a predetermined time after each transition to a low level output signal by said comparator output; and turn-off means coupled to said comparator output and adapted to be coupled to said semiconductor switches for turning off said semiconductor switches when said comparator generates a low level output signal;

whereby the conduction intervals of said semiconductor switches are pulse-width modulated to regulate the amplitudes of said phase currents.

2. The current regulator of claim 1 further comprising filter means for coupling said sensor means to said inverting input.

3. The current regulator of claim 1 wherein said delay means comprises a relaxation capacitor connected in parallel with a resistor.

4. The current regulator of claim 1 wherein said turn-off means comprises a plurality of diodes, each having its cathode connected to said comparator output and each having its anode adapted to be connected to the control electrode of a respective semiconductor switch.

5. The current regulator of claim 1 further comprising resistive means for coupling said sensor means to a DC voltage, and wherein said sensor means comprises a plurality of diode means, the anode at one end of each diode means being connected to said resistive means and coupled to said inverting input, the cathode at the other end of each diode means adapted to be connected to a respective semiconductor switch.

6. The current regulator of claim 1 further comprising resistive means for coupling said sensor means to a DC voltage, and wherein said sensor means comprises a plurality of series-connected diode-thermistor pairs, one end of each diode-thermistor pair connected to said resistive means and coupled to said inverting input, the other end of each diode-thermistor pair adapted to be connected to a respective semiconductor switch, each of said diodes oriented to conduct current from said resistive means to a respective semiconductor switch.

7. The current regulator of claim 5 wherein said resistive means comprises a resistor having one end connected to said diode means and having its other end adapted to be connected to a DC source, whereby said regulator is adapted to be connected to a motor drive employing non-overlapping phase conduction intervals.

8. The current regulator of claim 7 wherein said anti-latching means is comprised of a diode having its anode coupled to said inverting input and its cathode connected to said comparator output.

9. The current regulator of claim 5 wherein said resistive means comprises a plurality of resistors each for coupling a respective diode means to a DC source, and wherein said sensor means further includes a resistor coupling said inverting input to circuit common, whereby said regulator is adapted to be connected to a motor drive employing overlapping phase conduction intervals.

10. The current regulator of claim 9 wherein said anti-latching means is comprised of a plurality of solid-state switches, each of said solid-state switches having its positive electrode connected to a respective junction between a respective diode means and a respective resistor, each of said solid-state switches having its control electrode adapted to be connected to the control electrode of a respective semiconductor switch, and each of said solid-state switches having its negative electrode coupled to said inverting input.

11. The current regulator of claim 6 wherein said resistive means comprises a resistor having one end connected to each of said diode-thermistor pairs and having its other end adapted to be connected to a DC source, whereby said regulator is adapted to be connected to a motor drive employing nonoverlapping phase conduction intervals.

12. The current regulator of claim 11 wherein said anti-latching means is comprised of a diode having its anode coupled to said inverting input and its cathode connected to said comparator output.

13. The current regulator of claim 6 wherein said resistive means comprises a plurality of resistors each for coupling a respective diode-thermistor pair to a DC source, and wherein said sensor means further includes a resistor coupling said inverting input to circuit common, whereby said regulator is adapted to be connected to a motor drive employing overlapping phase conduction intervals.

14. The current regulator of claim 13 wherein said anti-latching means is comprised of a plurality of solid-state switches, each of said solid-state switches having its positive electrode connected to a respective junction between a respective diode-thermistor pair and a respective resistor, each of said solid-state switches having its control electrode adapted to be connected to the control electrode of a respective semiconductor switch, and each of said solid-state switches having its negative electrode coupled to said inverting input.

15. A drive circuit for a multiphase motor, said motor employing unidirectional current excitation from a DC source, each phase of said motor including a phase winding, said drive circuit comprising:

a plurality of semiconductor switches, each for connecting in series with a respective phase winding;

control means connected to said semiconductor switches for controlling said motor by turning on said semiconductor switches in sequence;

a comparator having a noninverting input, an inverting input and an output, said comparator generating a low logic level output signal when any instantaneous phase current exceeds a regulated current limit;

sensor means coupled to said inverting input and to said semiconductor switches for providing voltage signals, each of said voltage signals being proportional to the instantaneous phase current of a respective phase;

resistive means for coupling said sensor means to said DC source;

voltage-reference means coupled to said noninverting input for providing a reference signal proportional to said regulated current limit;

anti-latching means coupled to said comparator and to said sensor means for decoupling said inverting input from said sensor means when said comparator generates a low level output signal;

delay means coupled to said comparator for reducing said reference signal for a predetermined time after each transition to a low level output signal by said comparator output; and turn-off means coupled to said comparator output and to said semiconductor switches for turning off said semiconductor switches when said comparator generates a low level output signal;

whereby the conduction intervals of said semiconductor switches are pulse-width modulated to regulate the amplitudes of said phase currents.

16. The drive circuit of claim 15 further comprising filter means for coupling said sensor means to said inverting input.

17. The drive circuit of claim 15 wherein said delay means comprises a relaxation capacitor connected in parallel with a resistor.

18. The drive circuit of claim 15 wherein said turn-off means comprises a plurality of diodes, each having its cathode connected to said comparator output and each having its anode connected to the control electrode of a respective semiconductor switch.

19. The drive circuit of claim 15 wherein said sensor means comprises a plurality of diode means, the anode at one end of each diode means being connected to said resistive means and coupled to said inverting input, the cathode at the other end of each diode means being connected to a respective semiconductor switch.

20. The drive circuit of claim 15 wherein said sensor means comprises a plurality of series-connected diode-thermistor pairs, one end of each diode-thermistor pair being connected to said resistive means and coupled to said inverting input, the other end of each diode-thermistor pair being connected to a respective semiconductor switch, each of said diodes oriented to conduct current from said resistive means to a respective semiconductor switch.

21. The drive circuit of claim 19 wherein said resistive means comprises a resistor having one end connected to said diode means and having its other end adapted to be connected to said DC source, said drive circuit employing nonoverlapping phase conduction intervals.

22. The drive circuit of claim 21 wherein said anti-latching means is comprised of a diode having its anode coupled to said inverting input and its cathode connected to said comparator output.

23. The drive circuit of claim 19 wherein said resistive means comprises a plurality of resistors each for coupling a respective diode means to said DC source, and wherein said sensor means further includes a resistor coupling said inverting input to circuit common, said drive circuit employing overlapping phase conduction intervals.

24. The drive circuit of claim 23 wherein said anti-latching means is comprised of a plurality of solid-state switches, each of said solid-state switches having its positive electrode connected to a respective junction between a respective diode means and a respective resistor, each of said solid-state switches having its control electrode connected to the control electrode of a respective semiconductor switch and each of said solid-state switches having its negative electrode coupled to said inverting input.

25. The drive circuit of claim 20 wherein said resistive means comprises a resistor having one end connected to each of said diode-thermistor pairs and having its other end connected to said DC source, said drive circuit employing nonoverlapping phase conduction intervals.

26. The drive circuit of claim 25 wherein said anti-latching means is comprised of a diode having its anode coupled to said inverting input and its cathode connected to said comparator output.

27. The drive circuit of claim 20 wherein said resistive means comprises a plurality of resistors each for coupling a respective diode-thermistor pair to said DC source, and wherein said sensor means further includes a resistor coupling said inverting input to circuit common, said drive circuit employing overlapping phase conduction intervals.

28. The drive circuit of claim 27 wherein said anti-latching means is comprised to a plurality of solid-state switches, each of said solid-state switches having its positive electrode connected to a respective junction between a respective diode-thermistor pair and a respective resistor, each of said solid-state switches having its control electrode connected to the control electrode of a respective semiconductor switch, and each of said solid-state switches having its negative electrode coupled to said inverting input.

29. A motor drive system for connecting to a DC source, comprising:

a multiphase motor adapted for unidirectional current excitation, each phase of said motor including a phase winding;

a plurality of semiconductor switches, each connected in series with a respective phase winding;

control means connected to said semiconductor switches for controlling said motor by turning on said semiconductor switches in sequence;

a comparator having a noninverting input, an inverting input and an output, said comparator generating a low logic level output signal when any instantaneous phase current exceeds a regulated current limit;

sensor means coupled to said inverting input and to said semiconductor switches for providing voltage signals, each of said voltage signals being proportional to the instantaneous phase current of a respective phase;

resistive means for coupling said sensor means to said DC source;

voltage-reference means coupled to said noninverting input for providing a reference signal proportional to said regulated current limit;

anti-latching means coupled to said comparator and to said sensor means for decoupling said inverting input from said sensor means when said comparator generates a low level output signal;

delay means coupled to said comparator for reducing said reference signal for a predetermined time after each transition to a low level output signal by said comparator output; and turn-off means coupled to said comparator output and to said semiconductor switches for turning off said semiconductor switches when said comparator generates a low level output signal;

whereby the conduction intervals of said semiconductor switches are pulse-width modulated to regulate the amplitudes of said phase currents.

30. The drive system of claim 29 further comprising filter means for coupling said sensor means to said inverting input.

31. The drive system of claim 29 wherein said delay means comprises a relaxation capacitor connected in parallel with a resistor.

32. The drive system of claim 29 wherein said turn-off means comprises a plurality of diodes, each having its cathode connected to said comparator output and each having its anode connected to the control electrode of a respective semiconductor switch.

33. The drive system of claim 29 further comprising energy return means coupled to said phase windings for returning stored magnetic energy in said windings to said DC source.

34. The drive system of claim 33 wherein said multiphase motor is comprised of a switched reluctance motor.

* * * * *